United States Patent
Patel et al.

(10) Patent No.: US 9,686,783 B1
(45) Date of Patent: Jun. 20, 2017

(54) METHOD AND APPARATUS FOR PDCCH DETECTION

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 103 days.

(21) Appl. No.: 14/938,033

(22) Filed: Nov. 11, 2015

(51) Int. Cl.
*H04W 4/00* (2009.01)
*H04W 72/04* (2009.01)
*H04W 72/08* (2009.01)
*H04L 27/26* (2006.01)

(52) U.S. Cl.
CPC ....... *H04W 72/042* (2013.01); *H04L 27/2678* (2013.01); *H04W 72/082* (2013.01)

(58) Field of Classification Search
None
See application file for complete search history.

(56) References Cited

U.S. PATENT DOCUMENTS

| | | | | |
|---|---|---|---|---|
| 2003/0188252 A1* | 10/2003 | Kim | ...................... | H04L 1/0046 714/779 |
| 2011/0085513 A1* | 4/2011 | Chen | .................. | H04W 72/042 370/330 |
| 2011/0211659 A1* | 9/2011 | Kosakowski | ....... | H03M 13/413 375/341 |
| 2012/0151285 A1* | 6/2012 | Aue | .................. | H03M 13/3738 714/704 |
| 2012/0190377 A1* | 7/2012 | Li | .......................... | H04L 1/0061 455/452.1 |
| 2013/0205176 A1* | 8/2013 | Qian | ..................... | H04L 1/0038 714/704 |
| 2014/0219196 A1* | 8/2014 | Patel | ..................... | H04L 5/0091 370/329 |
| 2015/0358101 A1* | 12/2015 | Wachsmann | ......... | H04J 11/0036 370/329 |

* cited by examiner

*Primary Examiner* — Otis L Thompson, Jr.
(74) *Attorney, Agent, or Firm* — Lerner, David, Littenberg, Krumholz & Mentlik, LLP

(57) ABSTRACT

Low latency wireless communication applications require highly dynamic allocation of resources. Providing allocation information on a highly dynamic basis increases the overhead of control signaling for allocation. A technique known as blind PDCCH decoding is used to reduce the control signaling overhead for allocation information. However, blind decoding occasionally may lead to invalid detection of allocation messages which in turn may lead to a number of problems such as wasted bandwidth, more power consumption, reduced throughput, etc. A method and apparatus are disclosed that may detect the invalid allocation messages and discard them which in turn may lead to detection of valid allocation messages for increased data throughput and reduced power consumption and improve the overall performance.

20 Claims, 10 Drawing Sheets

Message transmitted over the air interface

Message transmitted over the air interface

METHOD AND APPARATUS FOR PDCCH DETECTION

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating with is referred as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred to as a neighbor cell.

Duplexing refers to the ability to provide bidirectional communication in a system, i.e., from base station to client terminals (DL) and from client terminals to base station (UL). There are different methods for providing bidirectional communication. One commonly used duplexing method is the Frequency Division Duplexing (FDD). In FDD wireless communication systems, two different frequencies, one for DL and another for UL are used for communication. In a FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the RF channel for DL and UL may alternate on periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically. In some communication systems, a predefined set of configurations may be used to select between different DL and UL duration ratios as shown in FIG. 2. These predefined configurations are referred herein as TDD configurations.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

The $3^{rd}$ Generation Partnership Project (3GPP) Long Term Evolution (LTE) wireless communication system is designed for low latency and high throughput applications. Supporting such applications requires the allocation of resources in a dynamic manner. This is different from the previous generation wireless communication systems which were designed for allocations that do not change for tens of seconds and even minutes or hours. In 3GPP LTE wireless communication system the resource allocation may change once every millisecond both in DL and UL.

The cost of such dynamic resource allocation is that the overhead for allocating resources is incurred every millisecond. To keep the overhead of resource allocation low while keeping the allocation dynamic, the 3GPP LTE wireless communication system employs several techniques. A control channel, called Physical Downlink Control Channel (PDCCH), is used for the purpose of dynamic resource allocation. The resource allocation message which is transmitted using the PDCCH is called Downlink Control Information (DCI). One of the requirements for a base station in a 3GPP LTE wireless communication system is the flexibility in addressing (sending resource allocation to) a particular client terminal through the PDCCH. This flexibility in turn requires the client terminal to search all possible PDCCH candidates within the control region of a subframe (SF) for possible resource allocation to it as shown in FIG. 3. This is referred to herein as blind PDCCH decoding and the portion of the control region in which the PDCCH search is performed is referred to as search space. The maximum number of decoding attempts in blind PDCCH decoding is 44 as specified in Release 8 and Release 9 of the specifications of 3GPP LTE wireless communication system. In later releases of specifications of 3GPP LTE-Advanced wireless communication system the number of candidates for blind PDCCH decoding may be increased even more. Furthermore, the increase in blind PDCCH decoding attempts for 3GPP LTE-Advanced wireless communication system may be proportional to the number of carriers supported for Carrier Aggregation (CA). In case a client terminal does not support CA, the number of decoding attempts in blind PDCCH decoding for a Release 10 or later client terminal may still be higher than or as high as in Release 8 and Release 9 3GPP specifications.

The information in PDCCH is protected by Forward Error Correction (FEC) coding as well as error detection. The error detection is based on a 16-bit Cyclic Redundancy Check (CRC). Different client terminals are identified in the 3GPP LTE wireless communication system using a type of identifier known as Radio Network Temporary Identifier (RNTI). Some RNTIs are of broadcast type which address more than one client terminal in a cell, whereas other RNTIs address a particular client terminal. In a PDCCH, a particular client terminal is addressed by the base station by scrambling the 16-bit CRC with the intended RNTI as shown in FIG. 4. The intended RNTI may be a broadcast RNTI or client terminal specific RNTI. The purpose of using the RNTI to scramble the CRC rather than including the RNTI in the payload is to reduce the overhead and to improve the performance of the FEC. The CRC encoded DCI message is then convolutionally encoded followed by interleaving and rate matching operations as shown in FIG. 5. In a 3GPP LTE wireless communication system, the convolutional code with constraint length K=7 is used as shown in FIG. 6. This means that the encoder may be in any one of the $2^{K-1}=64$ states. The rate matching may involve puncturing of some bits or repetition of some bits depending on the code rate for a given PDCCH.

In the client terminals during blind PDCCH decoding, the input to the PDCCH decoder may be from the signal transmitted by the serving base station or some random noise and interference signals from parts of the downlink signal where the serving base station may not be transmitting any information at all or may be transmitting information intended for other client terminals. In a given subframe only a few (typically two) out of all the blind PDCCH decoding attempts may have a useful signal transmitted by the serving base station intended for a particular client terminal. In case a client terminal decodes a PDCCH with passing CRC and the decoded RNTI matching with its own assigned RNTI when the base station is not actually transmitting a PDCCH for that client terminal, it is defined herein as invalid PDCCH decoding. The probability that a random 16-bit pattern matches the CRC for the payload portion of the data is $1/2^{16}$. Considering that there are 44 blind PDCCH decoding attempts made by the client terminal per subframe (1 ms), the probability of getting an invalid PDCCH decoding per subframe is $44/2^{16}$. Furthermore, the PDCCH CRC is checked in conjunction with multiple RNTIs that may be configured by the base station. A base station is referred to as an evolved Node B (eNB) in 3GPP LTE wireless communication system. For example, if on average two RNTIs are used by the client terminal at any given time, the probability of invalid PDCCH detection increases by a factor of two, i.e., $(2*44)/2^{16}$. This translates to about 0.00134 per millisecond (one subframe) or about 1.34 invalid PDCCH CRC pass per second. In case of a 3GPP LTE-Advanced wireless communication system with CA, this probability grows higher in proportion to the number of component carriers and the additional number of blind decoding attempts. It is to be understood that the invalid PDCCH detection may occur with higher probability if the number of blind PDCCH decoding attempts is increased in case LTE-Advanced and later releases of the 3GPP specifications.

In addition to invalid PDCCH detection, a duplicate PDCCH may be detected because of the different code rate used in FEC for different candidates of PDCCH.

The invalid PDCCH detection may lead to invalid DCI payload which in turn may lead to invalid resource allocation. The terms invalid PDCCH and invalid DCI are used interchangeably herein. Such invalid PDCCH detection can cause two types of problems. If the invalid PDCCH detection is related to DL resource allocation then it may cause the client terminal to receive the DL data that does not actually contain any information for that particular client terminal. This may result in increased power consumption in the client terminal. Furthermore, if there was a valid PDCCH transmitted for the client terminal in the same subframe, it may be missed since the client terminal may stop performing blind PDCCH decoding after successfully detecting the required number of PDCCHs. This may lead to reduced throughput for the client terminal and at the same time wasted resources (allocated but unused) and lead to reduced performance. If there is another downlink allocation using a broadcast RNTI in the same subframe, there may be a conflict in the resources allocated by the DCI message in the invalid PDCCH and the DCI message in the valid PDCCH for a broadcast RNTI. This may cause the client terminal to behave in unpredictable manner and could result in the client terminal not receiving the data intended for it.

For the UL direction, invalid PDCCH detection may result in the client terminal transmitting on resources that are not allocated to it. This may cause interference to one or more other client terminals which may be allocated those particular resources. This may lead to increased power consumption and reduced throughput for all the client terminals that may be transmitting on those particular allocated resources since the interference may lead to failed transmissions which may require retransmissions. Furthermore, if there was a valid PDCCH with UL resource allocation transmitted for the client terminal, it may be missed since the client terminal may stop performing blind PDCCH decoding after detecting the required number of PDCCHs. This may lead to reduced throughput for the client terminal and wasted resources (allocated but unused) in the UL.

The 3GPP LTE wireless communication system employs Hybrid Automatic Repeat Request (HARQ). Information regarding the HARQ protocol such as the process number, the Modulation and Coding Scheme (MCS), the Redundancy Version (RV), and whether a new transmission or retransmission may be taking place is sent as part of a DCI message. Invalid PDCCH detection may cause the HARQ Finite State Machine (FSM) running at the client terminal and at the eNB to be out of synchronization. For each DL resource allocation a corresponding HARQ acknowledgement must be sent in the UL. The exact allocation of UL resources for sending the acknowledgement is implicitly based on the exact resources corresponding to the PDCCH blind decoding candidate. The invalid PDCCH decoding then in turn leads to transmission of DL HARQ ACK/NACK (positive or negative acknowledgement) in the UL direction in the wrong UL resources and possibly interfering with other client terminals that may be sending their respective DL HARQ ACK/NACK in those resources.

When a client terminal is in spatial multiplexing mode, the DCI message may contain the allocation information such as the MCS, RV, and a new data indication for two codewords which may be mapped to the different layers of spatially multiplexed data transmission from the eNB. The transmission of HARQ ACK/NACK due to invalid DCI in those scenarios may cause further degradation because additional resources may be used for HARQ ACK/NACK transmission.

A client terminal may schedule decoding of the UL HARQ ACK/NACK for the UL transmission triggered by invalid PDCCH detection for UL resource. According to the 3GPP LTE wireless communication system HARQ protocol in UL, if a NACK is received in DL for a UL transmission, the client terminal is expected to automatically send a retransmission on the same resources as the original transmission causing further interference to other users. This process may continue until the maximum retransmissions are reached.

The invalid PDCCH decoding may lead to a series of problems that may compound both in DL and UL over a period of several radio frames.

Note that the invalid PDCCH detection rate mentioned earlier is only for one particular client terminal. A cell may typically serve a number of active users, in the order of dozens of client terminals. This means that the invalid PDCCH detection on a per subframe per cell basis can become very high and may disrupt the normal operation of the network.

SUMMARY

A method and apparatus are disclosed that may enable a client terminal to filter out an invalid PDCCH detection and thereby may improve throughput, reduce power consumption, avoid wasted resources and improve the overall performance.

In accordance with an aspect of the present invention, a method for validating a Physical Downlink Control Channel (PDCCH) candidate within a control region of a subframe in a wireless communication system may include controlling, by a processing device, for each first PDCCH candidate of at least one PDCCH candidate within the control region of the subframe: determining a minimum path metric and a maximum path metric based on decoding of the first PDCCH candidate; determining whether a check of a first Cyclic Redundancy Check (CRC) of the first PDCCH candidate, against a received CRC for the first PDCCH candidate passes, in which the first CRC of the first PDCCH candidate is determined from decoded bits based on the decoding of the first PDCCH candidate and is scrambled by an expected Radio Network Temporary Identifier (RNTI); when the first CRC of the first PDCCH candidate is determined to pass the check, determining whether the first CRC of the first PDCCH candidate is a duplicate of another CRC of another PDCCH candidate of the least one PDCCH candidate determined to pass the check for the same expected RNTI, when the first CRC of the first PDCCH candidate is determined not be a duplicate of the another CRC of the another PDCCH candidate, storing in a memory the minimum path metric and the maximum path metric of the first CRC of the first PDCCH candidate, and when the first CRC of the first PDCCH candidate is determined to be a duplicate of the another CRC of the another PDCCH candidate, determining which of the first CRC of the first PDCCH candidate and the another CRC of the another PDCCH candidate has a larger difference between the minimum path metric and the maximum path metric respectively, and of the first CRC of the first PDCCH candidate and the another CRC of the another PDCCH candidate, storing in the memory only the minimum path metric and the maximum path metric determined to have the larger difference.

In one alternative, the decoding may include forward trellis searching in a Viterbi algorithm.

In one alternative, the method may include, controlling, by the processing device, when the first CRC of the first PDCCH candidate is determined to have the larger difference, overwriting the minimum path metric and the maximum path metric for the another CRC of the another PDCCH candidate stored in the memory with the minimum path metric and the maximum path metric for the first CRC of the first PDCCH candidate.

In one alternative, the method may include controlling, by the processing device, when the first CRC of the first PDCCH candidate is determined not to pass the check, discarding the minimum path metric and the maximum path metric for the first CRC of the first PDCCH candidate.

In one alternative, the at least one PDCCH candidate may include all possible PDCCH candidates within the control region, and the method may include controlling, by the processing device, determining at least one most likely true PDCCH candidate from all PDCCH candidates for which the minimum path metric and the maximum path metric are stored in the memory.

In one alternative, the at least one most likely true PDCCH candidate may be determined as having the difference between the minimum path metric and the maximum path metric thereof larger than the difference between the minimum path metric and the maximum path metric for a second PDCCH candidate of the all PDCCH candidates stored in the memory.

In one alternative, the at least one most likely true PDCCH candidate may be determined based on grouping the all PDCCH candidates for which the minimum path metric and the maximum path metric are stored in the memory according to (i) a length and format of a payload message of (ii) the expected RNTI.

In one alternative, the determining of whether the check of the first Cyclic Redundancy Check (CRC) of the first PDCCH candidate against the received CRC for the first PDCCH candidate passes may be performed for each of a plurality of predetermined RNTIs as the expected RNTI until the first CRC of the first PDCCH candidate is determined to pass the check or the check is completed for all of the predetermined RNTIs.

In accordance with an aspect of the present invention, an apparatus for validating a Physical Downlink Control Channel (PDCCH) candidate within a control region of a subframe in a wireless communication system may include circuitry. The circuitry may be configured to control, for each first PDCCH candidate of at least one PDCCH candidate within the control region of the subframe: determining a minimum path metric and a maximum path metric based on decoding of the first PDCCH candidate; determining whether a check of a first Cyclic Redundancy Check (CRC) of the first PDCCH candidate, against a received CRC for the first PDCCH candidate passes, in which the first CRC of the first PDCCH candidate is determined from decoded bits based on the decoding of the first PDCCH candidate and is scrambled by an expected Radio Network Temporary Identifier (RNTI); when the first CRC of the first PDCCH candidate is determined to pass the check, determining whether the first CRC of the first PDCCH candidate is a duplicate of another CRC of another PDCCH candidate of the least one PDCCH candidate determined to pass the check for the same expected RNTI, when the first CRC of the first PDCCH candidate is determined not be a duplicate of the another CRC of the another PDCCH candidate, storing in a memory the minimum path metric and the maximum path metric of the first CRC of the first PDCCH candidate, and when the first CRC of the first PDCCH candidate is determined to be a duplicate of the another CRC of the another PDCCH candidate, determining which of the first CRC of the first PDCCH candidate and the another CRC of the another PDCCH candidate has a larger difference between the minimum path metric and the maximum path metric respectively, and of the first CRC of the first PDCCH candidate and the another CRC of the another PDCCH candidate, storing in the memory only the minimum path metric and the maximum path metric determined to have the larger difference.

In one alternative of the apparatus, the circuitry may be configured to control, when the first CRC of the first PDCCH candidate is determined to have the larger difference, overwriting the minimum path metric and the maximum path metric for the another CRC of the another PDCCH candidate stored in the memory with the minimum path metric and the maximum path metric for the first CRC of the first PDCCH candidate.

In one alternative of the apparatus, the at least one PDCCH candidate may include all possible PDCCH candidates within the control region, and the circuitry may be configured to control determining at least one most likely true PDCCH candidate from all PDCCH candidates for which the minimum path metric and the maximum path metric are stored in the memory.

In one alternative of the apparatus, the at least one most likely true PDCCH candidate may be determined as having the difference between the minimum path metric and the maximum path metric thereof larger than the difference between the minimum path metric and the maximum path metric for a second PDCCH candidate of the all PDCCH candidates stored in the memory.

In one alternative of the apparatus, the at least one most likely true PDCCH candidate may be determined based on grouping the all PDCCH candidates for which the minimum path metric and the maximum path metric are stored in the memory according to (i) a length and format of a payload message or (ii) the expected RNTI.

In one alternative of the apparatus, the determining of whether the check of the first Cyclic Redundancy Check (CRC) of the first PDCCH candidate against the received CRC for the first PDCCH candidate passes may be performed for each of a plurality of predetermined RNTIs as the expected RNTI until the first CRC of the first PDCCH candidate is determined to pass the check or the check is completed for all of the predetermined RNTIs.

In accordance with an aspect of the present invention, a wireless communication device may include a receiver to receive a subframe in a wireless communication system. In addition, the device may include a processing device configured to control validating a Physical Downlink Control Channel (PDCCH) candidate within a control region of the subframe. The processing device may be configured to control, for each first PDCCH candidate of at least one PDCCH candidate within the control region of the subframe: determining a minimum path metric and a maximum path metric based on decoding of the first PDCCH candidate; determining whether a check of a first Cyclic Redundancy Check (CRC) of the first PDCCH candidate, against a received CRC for the first PDCCH candidate passes, in which the first CRC of the first PDCCH candidate is determined from decoded bits based on the decoding of the first PDCCH candidate and is scrambled by an expected Radio Network Temporary Identifier (RNTI); when the first CRC of the first PDCCH candidate is determined to pass the check, determining whether the first CRC of the first PDCCH candidate is a duplicate of another CRC of another PDCCH candidate of the least one PDCCH candidate determined to pass the check for the same expected RNTI, when the first CRC of the first PDCCH candidate is determined not be a duplicate of the another CRC of the another PDCCH candidate, storing in a memory the minimum path metric and the maximum path metric of the first CRC of the first PDCCH candidate, and when the first CRC of the first PDCCH candidate is determined to be a duplicate of the another CRC of the another PDCCH candidate, determining which of the first CRC of the first PDCCH candidate and the another CRC of the another PDCCH candidate has a larger difference between the minimum path metric and the maximum path metric respectively, and of the first CRC of the first PDCCH candidate and the another CRC of the another PDCCH candidate, storing in the memory only the minimum path metric and the maximum path metric determined to have the larger difference.

In one alternative of the device, the processing device may be configured to control, when the first CRC of the first PDCCH candidate is determined to have the larger difference, overwriting the minimum path metric and the maximum path metric for the another CRC of the another PDCCH candidate stored in the memory with the minimum path metric and the maximum path metric for the first CRC of the first PDCCH candidate.

In one alternative of the device, the at least one PDCCH candidate may include all possible PDCCH candidates within the control region, and the processing device may be configured to control determining at least one most likely true PDCCH candidate from all PDCCH candidates for which the minimum path metric and the maximum path metric are stored in the memory.

In one alternative of the device, the at least one most likely true PDCCH candidate may be determined as having the difference between the minimum path metric and the maximum path metric thereof larger than the difference between the minimum path metric and the maximum path metric for a second PDCCH candidate of the all PDCCH candidates stored in the memory.

In one alternative of the device, the at least one most likely true PDCCH candidate may be determined based on grouping the all PDCCH candidates for which the minimum path metric and the maximum path metric are stored in the memory according to (i) a length and format of a payload message or (ii) the expected RNTI.

In one alternative of the device, the determining of whether the check of the first Cyclic Redundancy Check (CRC) of the first PDCCH candidate against the received CRC for the first PDCCH candidate passes may be performed for each of a plurality of predetermined RNTIs as the expected RNTI until the first CRC of the first PDCCH candidate is determined to pass the check or the check is completed for all of the predetermined RNTIs.

DETAILED DESCRIPTION

Figure 1:
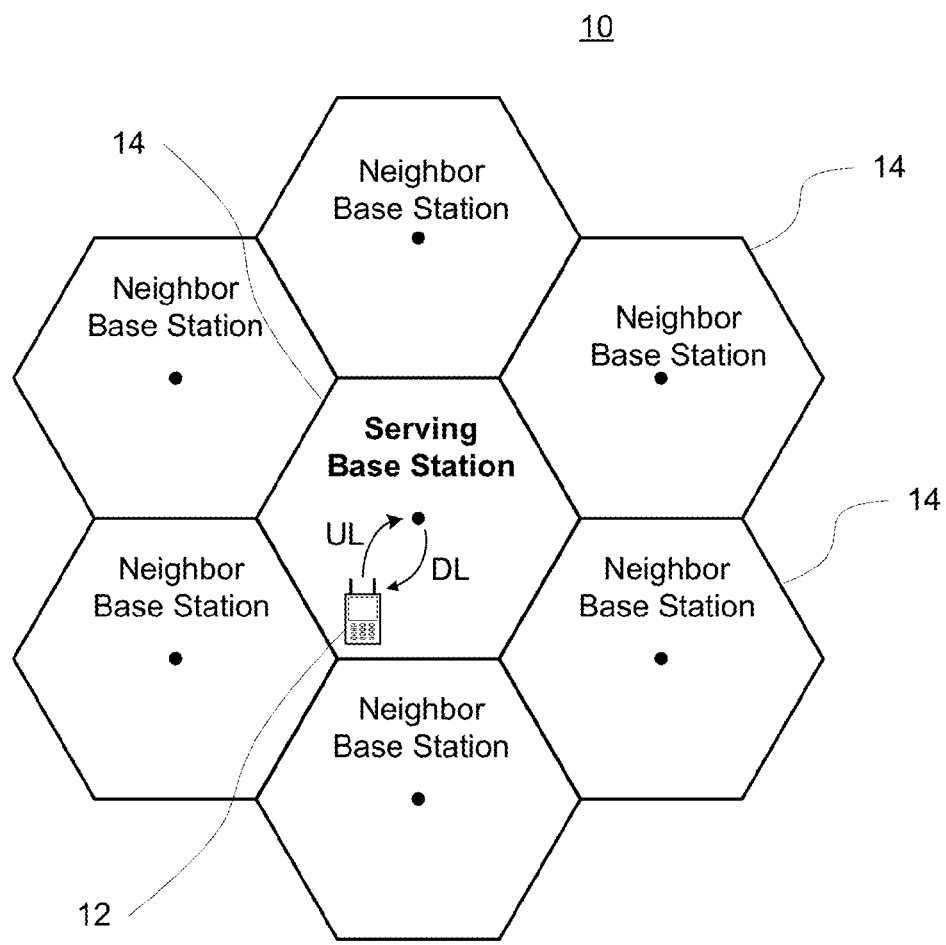
FIG. 1 illustrates a conventional wireless cellular communication system.
Figure 2:
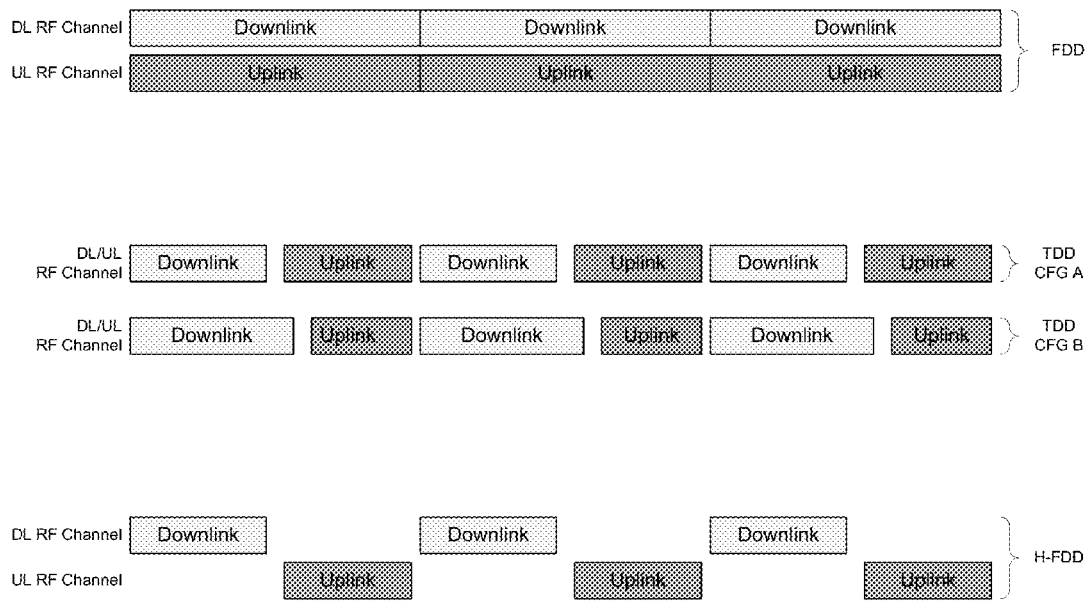
FIG. 2 illustrates FDD, TDD and H-FDD duplexing techniques.
Figure 3:
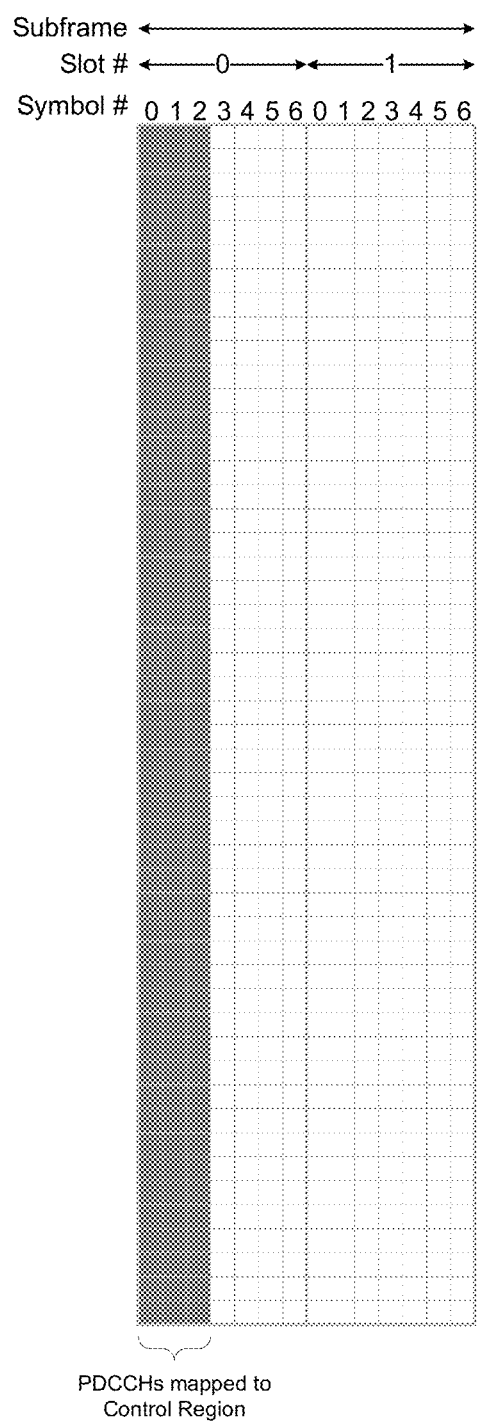
FIG. 3 illustrates a subframe including a control region where PDCCHs are mapped in a 3GPP LTE wireless communication system.
Figure 4:
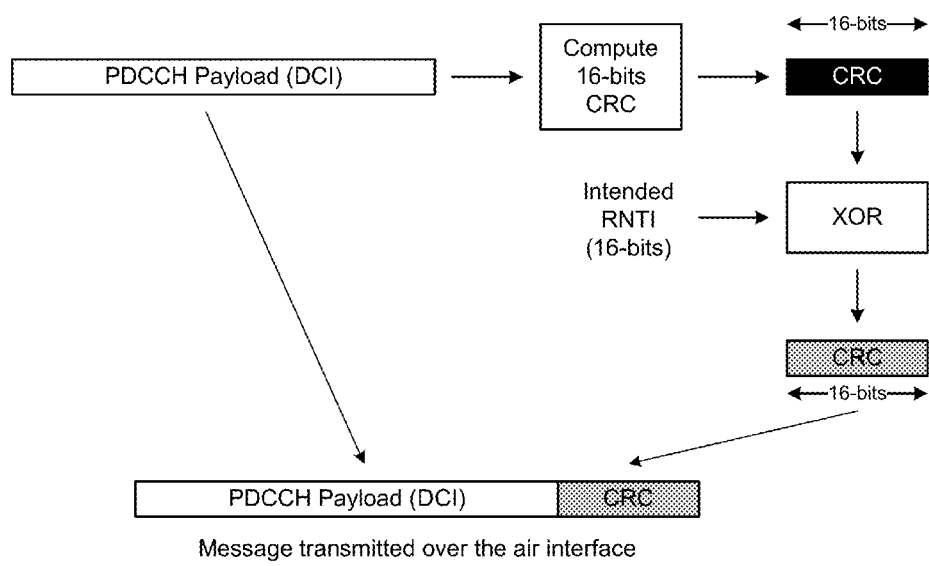
FIG. 4 illustrates the CRC computation for a DCI message and insertion of RNTI for a DCI in a 3GPP LTE wireless communication system.
Figure 5:
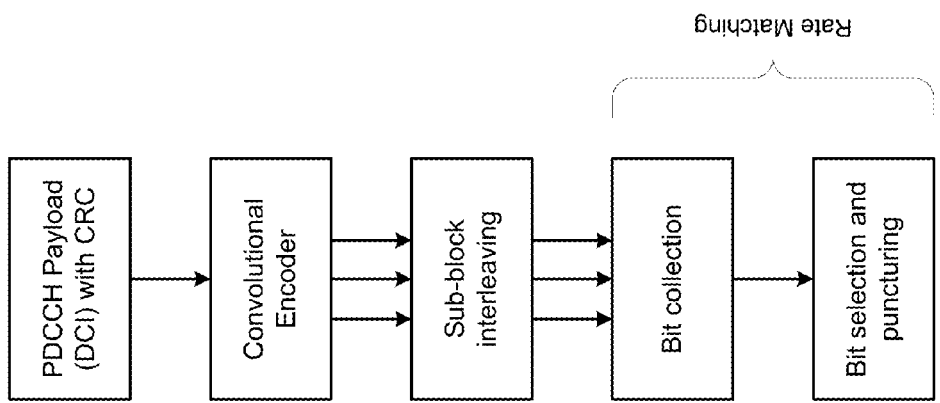
FIG. 5 illustrates the Forward Error Correction steps for the PDCCH in a 3GPP LTE wireless communication system.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Some invalid PDCCH CRC pass detections may be identified by checking the contents of the decoded DCI message. A method and apparatus are described that enable detection of an invalid PDCCH CRC pass before the parsing of the DCI message content. It is to be understood that the aspects of the present invention may be applicable with regard to any number of blind PDCCH decoding attempts.

Figure 6:
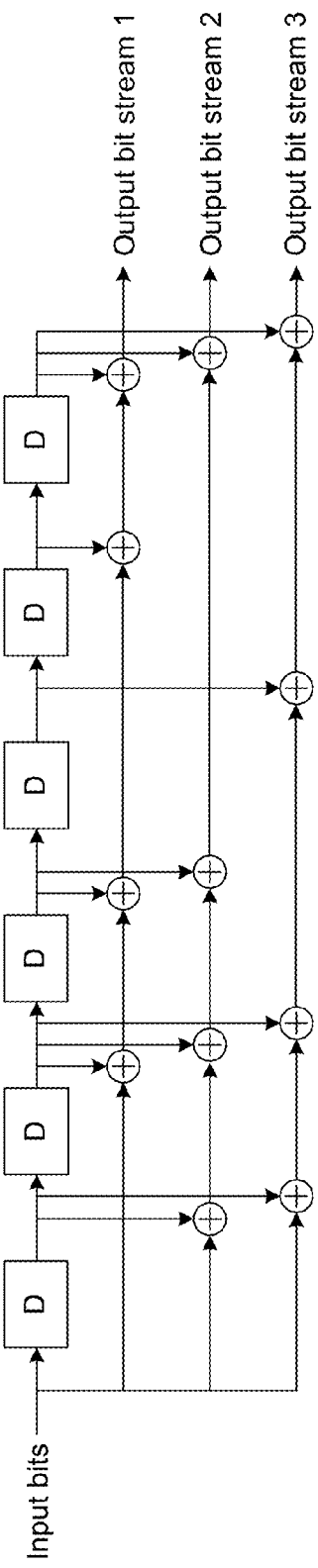
FIG. 6 illustrates the details of the convolutional encoding steps for the PDCCH in a 3GPP LTE wireless communication system.

The PDCCH decoder in a client terminal may use the Viterbi algorithm, which is one of the commonly used algorithms for decoding convolutionally encoded data as in the case for PDCCH. Viterbi algorithm performs maximum likelihood sequence estimation for a given received signal by performing distance computations for all possible transmitted bit sequences and retaining only the sequences that are closest to the received signal. The Viterbi algorithm may maintain $2^{K-1}=64$ states corresponding to the state of the encoder as shown in FIG. 6. The cumulative distances for the possible bit sequences are referred as path metrics. Normally, in the Viterbi algorithm, after completing the forward trellis processing, the state with the minimum path metric is determined and it is used to start the trace back for decoding the message sequence. This requires the search for the minimum path metric and the state associated with it. According to an aspect of the present invention, the minimum path metric for each blind PDCCH decoding candidate may be saved after the forward trellis processing is completed in Viterbi algorithm. According to an aspect of the present invention, the maximum path metric also may be searched and saved at the end of forward trellis processing. After performing the trace back operation of the Viterbi algorithm of the message, the CRC check may be performed. According to an aspect of the present invention, if the PDCCH CRC passes for any one of the configured RNTIs, the saved minimum and maximum path metrics may be retained, otherwise the minimum and maximum path metrics may be discarded. If the PDCCH CRC pass corresponds to a duplicate DCI, then the minimum and maximum metric with the largest of the difference of the two duplicate DCIs may be saved and may overwrite the previously saved metrics for the same CRC and RNTI.

According to an aspect of the present invention, the PDCCH blind decoding may be always carried out for all possible candidates in the blind PDCCH decoding search space. At the end of the blind decoding the minimum and maximum path metrics for all the PDCCH candidates with CRC pass may be used to determine the most likely true PDCCH CRC pass candidates. This may eliminate the invalid PDCCH CRC pass candidates. According to an aspect of the present invention, the difference between the minimum path metric and the maximum path metric of a given PDCCH candidate may be used as a metric to determine the true PDCCH CRC pass. From all the PDCCH candidates that pass CRC, the ones with the highest difference between the minimum and maximum path metrics may be considered as true PDCCH CRC pass. The number of candidates to be considered for PDCCH CRC pass may be configured by the software or firmware operating in the client terminal depending on the different scenarios. According to an aspect of the present invention, the search for the PDCCH CRC pass candidates with the highest difference of minimum and maximum metrics may be grouped according to the length and format of the payload message (DCI). This may enable detection of separate PDCCH CRC pass candidates for downlink and uplink assignments. According to an aspect of the present invention, the search for the PDCCH CRC pass candidates with the highest difference of minimum and maximum metrics may be grouped according to the RNTI used to scramble the CRC. This may enable detection of separate PDCCH CRC pass candidates for dedicated RNTI and broadcast RNTI.

Figure 7:
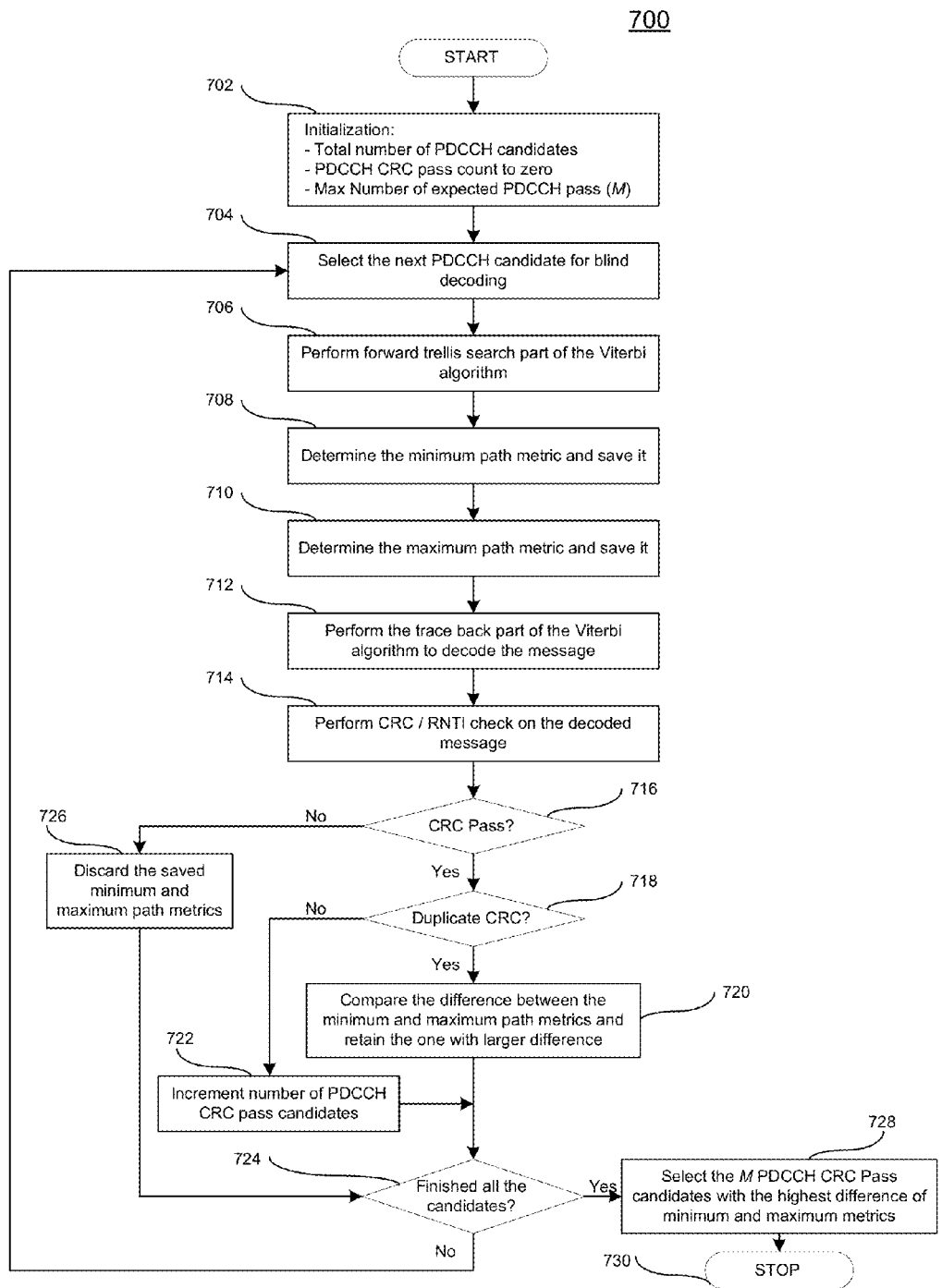
FIG. 7 illustrates the flow diagram for the processing steps according to aspects of the present invention.

The flow diagram 700 contained in FIG. 7 illustrates the invalid DCI filtering method according to aspects of the present invention. The processing relevant to the present invention begins at the processing stage 702, where the total number of PDCCH candidates to be attempted in current subframe and the maximum number of expected PDCCH candidates (M) to pass CRC are initialized. The number of PDCCH candidates with passing CRC for the current subframe is initialized to zero. At processing stage 704, a PDCCH candidate for blind decoding is selected. At processing stage 706, the forward trellis search part of the Viterbi algorithm is performed. At processing stage 708, the minimum path metric from all the possible trellis states (in current example, $2^{K-1}=64$ states) is determined and saved. At processing stage 710, the maximum path metric from all the possible trellis states is determined and saved. At processing stage 712, the trace back part of the Viterbi algorithm is performed to decode the PDCCH message. At processing stage 714, the CRC is computed from the decoded bits and scrambled by the expected RNTI. The computed CRC is then compared against the received CRC. At processing stage 716, a determination is made whether the CRC has passed or not. If the CRC fails, the processing continues at processing stage 726 where the saved minimum path metric and the maximum path metric are discarded. The processing then continues at processing stage 724. Returning to processing stage 716, if the CRC passes, the processing continues at processing stage 718 where a determination is made whether the CRC is a duplicate CRC corresponding to a duplicate DCI detection in the current subframe. If the passing CRC is not a duplicate CRC, the processing continues at processing stage 722 where the number of PDCCH CRC pass candidates is incremented by one and the processing continues at processing stage 724. Returning to processing stage 718, if the passing CRC is found to be a duplicate CRC, the processing continues at processing stage 720. At processing stage 720, the difference between the minimum path metric and maximum path metric of the currently decoded PDCCH candidate is compared with the difference between the minimum path metric and maximum path metric of the previously detected PDCCH with the same CRC in the current subframe. The PDCCH candidate with the larger difference between the minimum path metric and maximum path metric is retained and the other PDCCH candidate is discarded along with its minimum path metric and maximum path metric. The processing then continues at processing stage 724. At processing stage 724, a determination is made whether decoding attempt for all the PDCCH candidates for the current subframe is made or not. If the decoding for all the PDCCH candidates is not attempted, the processing returns to the processing stage 704. If the decoding for all the PDCCH candidates is attempted, the processing continues at processing stage 728 where the M PDCCH CRC pass candidates with the highest difference between the minimum and maximum path metrics are selected. The processing then suitably terminates at stage 730. By way of example only, the above-described method may be implemented in a receiver, e.g., a user device such as a wireless mobile station (MS) 12 as shown in FIG. 1.

Figure 8:
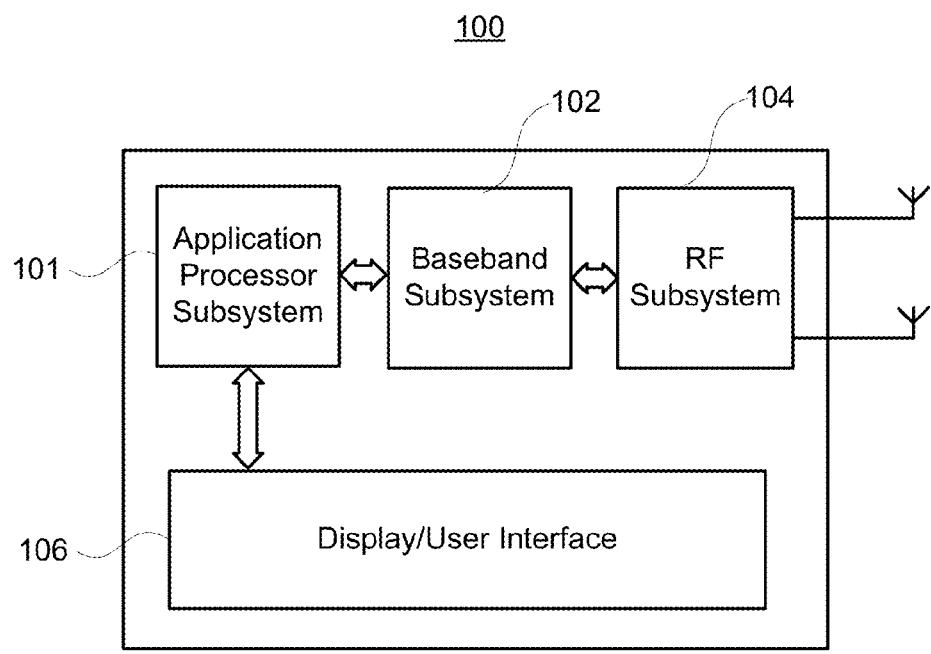
FIG. 8 illustrates a wireless mobile station diagram, which may be employed with aspects of the invention described herein.

As shown in FIG. 8, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 9:
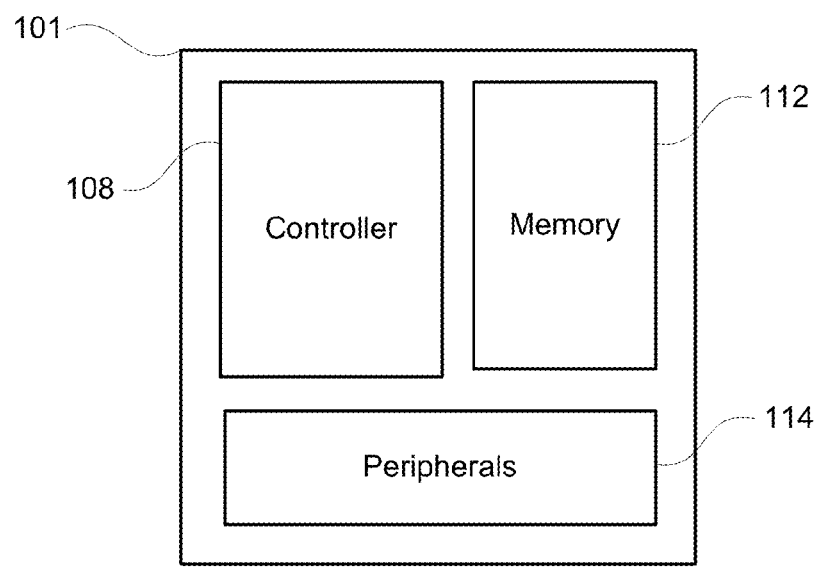
FIG. 9 illustrates an application processor subsystem for a wireless mobile station, which may be employed with aspects of the invention described herein.
Figure 10:
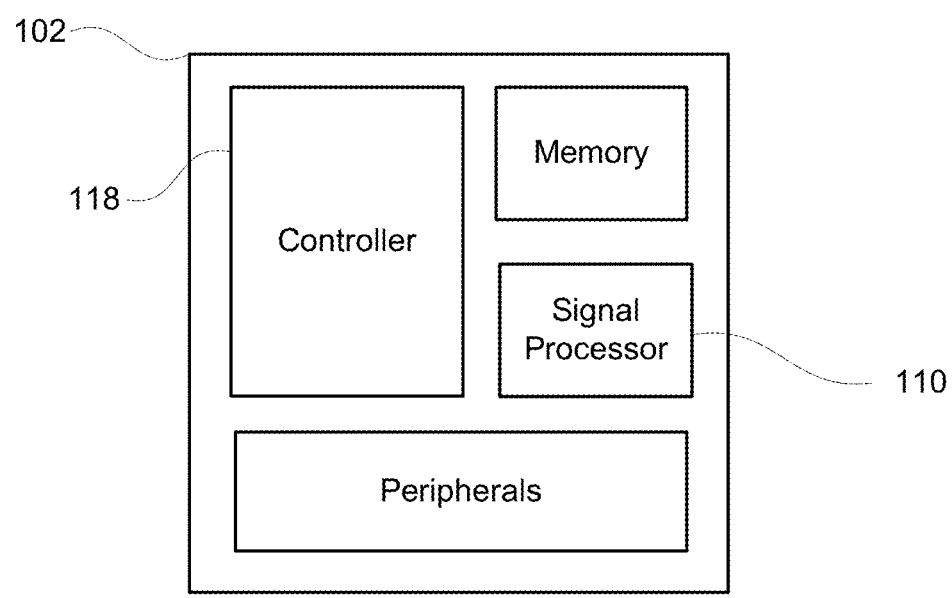
FIG. 10 illustrates a baseband subsystem for a wireless mobile station, which may be employed with aspects of the invention described herein.
Figure 11:
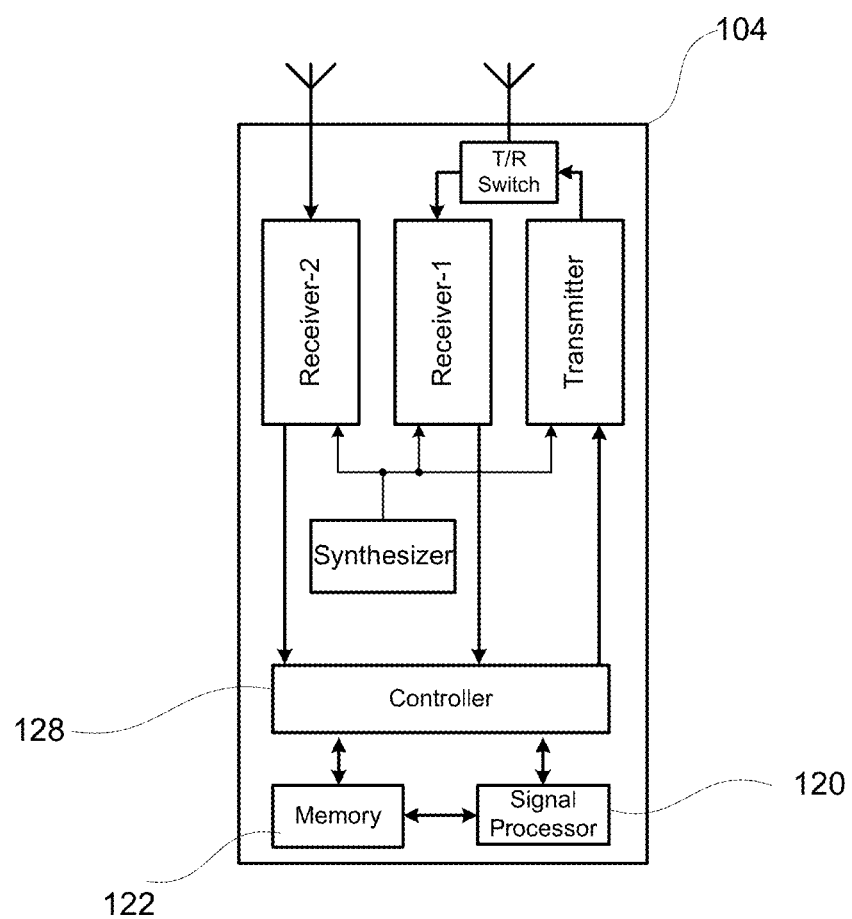
FIG. 11 illustrates an RF subsystem for a wireless mobile station, which may be employed with aspects of the invention described herein.

The application processor subsystem 101 as shown in FIG. 9 may include a controller 108 such as a microcontroller another processor or other circuitry. The baseband subsystem 102 as shown in FIG. 10 may include a controller 118 such as a microcontroller or other processor. The RF subsystem 104 as shown in FIG. 11 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 10 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for validating a Physical Downlink Control Channel (PDCCH) candidate within a control region of a subframe in a wireless communication system, the method comprising:

controlling, by a processing device, for each first PDCCH candidate of at least one PDCCH candidate within the control region of the subframe:
  determining a minimum path metric and a maximum path metric based on decoding of the first PDCCH candidate;
  determining whether a check of a first Cyclic Redundancy Check (CRC) of the first PDCCH candidate, against a received CRC for the first PDCCH candidate passes, in which the first CRC of the first PDCCH candidate is determined from decoded bits based on the decoding of the first PDCCH candidate and is scrambled by an expected Radio Network Temporary Identifier (RNTI);
  when the first CRC of the first PDCCH candidate is determined to pass the check, determining whether the first CRC of the first PDCCH candidate is a duplicate of another CRC of another PDCCH candidate of the least one PDCCH candidate determined to pass the check for the same expected RNTI,
  when the first CRC of the first PDCCH candidate is determined not be a duplicate of the another CRC of the another PDCCH candidate, storing in a memory the minimum path metric and the maximum path metric of the first CRC of the first PDCCH candidate, and
  when the first CRC of the first PDCCH candidate is determined to be a duplicate of the another CRC of the another PDCCH candidate,
    determining which of the first CRC of the first PDCCH candidate and the another CRC of the another PDCCH candidate has a larger difference between the minimum path metric and the maximum path metric respectively, and
    of the first CRC of the first PDCCH candidate and the another CRC of the another PDCCH candidate, storing in the memory only the minimum path metric and the maximum path metric determined to have the larger difference.

2. The method of claim 1, wherein the decoding includes forward trellis searching in a Viterbi algorithm.

3. The method of claim 1, further comprising:
controlling, by the processing device, when the first CRC of the first PDCCH candidate is determined to have the larger difference, overwriting the minimum path metric and the maximum path metric for the another CRC of the another PDCCH candidate stored in the memory with the minimum path metric and the maximum path metric for the first CRC of the first PDCCH candidate.

4. The method of claim 1, further comprising:
controlling, by the processing device, when the first CRC of the first PDCCH candidate is determined not to pass the check, discarding the minimum path metric and the maximum path metric for the first CRC of the first PDCCH candidate.

5. The method of claim 1,
wherein the at least one PDCCH candidate includes all possible PDCCH candidates within the control region, and
the method further comprising:
controlling, by the processing device, determining at least one most likely true PDCCH candidate from all PDCCH candidates for which the minimum path metric and the maximum path metric are stored in the memory.

6. The method of claim 5,
wherein the at least one most likely true PDCCH candidate is determined as having the difference between the minimum path metric and the maximum path metric thereof larger than the difference between the minimum path metric and the maximum path metric for a second PDCCH candidate of the all PDCCH candidates stored in the memory.

7. The method of claim 5,
wherein the at least one most likely true PDCCH candidate is determined based on grouping the all PDCCH candidates for which the minimum path metric and the maximum path metric are stored in the memory according to (i) a length and format of a payload message of (ii) the expected RNTI.

8. The method of claim 1,
wherein the determining of whether the check of the first Cyclic Redundancy Check (CRC) of the first PDCCH candidate against the received CRC for the first PDCCH candidate passes is performed for each of a plurality of predetermined RNTIs as the expected RNTI until the first CRC of the first PDCCH candidate is determined to pass the check or the check is completed for all of the predetermined RNTIs.

9. An apparatus for validating a Physical Downlink Control Channel (PDCCH) candidate within a control region of a subframe in a wireless communication system, the apparatus comprising:
a processor; and
a memory comprising instructions, which when executed by the processor, control, for each first PDCCH candidate of at least one PDCCH candidate within the control region of the subframe:
determining a minimum path metric and a maximum path metric based on decoding of the first PDCCH candidate;
determining whether a check of a first Cyclic Redundancy Check (CRC of the first PDCCH candidate, against a received CRC for the first PDCCH candidate passes, in which the first CRC of the first PDCCH candidate is determined from decoded bits based on the decoding of the first PDCCH candidate and is scrambled by an expected Radio Network Temporary Identifier (RNTI);
when the first CRC of the first PDCCH candidate is determined to pass the check, determining whether the first CRC of the first PDCCH candidate is a duplicate of another CRC of another PDCCH candidate of the least one PDCCH candidate determined to pass the check for the same expected RNTI,
when the first CRC of the first PDCCH candidate is determined not be a duplicate of the another CRC of the another PDCCH candidate, storing in a memory the minimum path metric and the maximum path metric of the first CRC of the first PDCCH candidate, and
when the first CRC of the first PDCCH candidate is determined to be a duplicate of the another CRC of the another PDCCH candidate,
determining which of the first CRC of the first PDCCH candidate and the another CRC of the another PDCCH candidate has a larger difference between the minimum path metric and the maximum path metric respectively, and
of the first CRC of the first PDCCH candidate and the another CRC of the another PDCCH candidate, storing in the memory only the minimum path metric and the maximum path metric determined to have the larger difference.

10. The apparatus of claim 9,
wherein the instructions when executed by the processor control, when the first CRC of the first PDCCH candidate is determined to have the larger difference, overwriting the minimum path metric and the maximum path metric for the another CRC of the another PDCCH candidate stored in the memory with the minimum path metric and the maximum path metric for the first CRC of the first PDCCH candidate.

11. The apparatus of claim 9,
wherein the at least one PDCCH candidate includes all possible PDCCH candidates within the control region, and
wherein the instructions, when executed by the processor, control determining at least one most likely true PDCCH candidate from all PDCCH candidates for which the minimum path metric and the maximum path metric are stored in the memory.

12. The apparatus of claim 11,
wherein the at least one most likely true PDCCH candidate is determined as having the difference between the minimum path metric and the maximum path metric thereof larger than the difference between the minimum path metric and the maximum path metric for a second PDCCH candidate of the all PDCCH candidates stored in the memory.

13. The apparatus of claim 11,
wherein the at least one most likely true PDCCH candidate is determined based on grouping the all PDCCH candidates for which the minimum path metric and the maximum path metric are stored in the memory according to (i) a length and format of a payload message or (ii) the expected RNTI.

14. The apparatus of claim 9,
wherein the determining of whether the check of the first Cyclic Redundancy Check (CRC) of the first PDCCH candidate against the received CRC for the first PDCCH candidate passes is performed for each of a plurality of predetermined RNTIs as the expected RNTI until the first CRC of the first PDCCH candidate is determined to pass the check or the check is completed for all of the predetermined RNTIs.

15. A wireless communication device comprising:
a receiver to receive a subframe in a wireless communication system; and
a processing device configured to control validating a Physical Downlink Control Channel (PDCCH) candidate within a control region of the subframe,
wherein the processing device is configured to control, for each first PDCCH candidate of at least one PDCCH candidate within the control region of the subframe:
determining a minimum path metric and a maximum path metric based on decoding of the first PDCCH candidate;
determining whether a check of a first Cyclic Redundancy Check (CRC) of the first PDCCH candidate, against a received CRC for the first PDCCH candidate passes, in which the first CRC of the first PDCCH candidate is determined from decoded bits based on the decoding of the first PDCCH candidate and is scrambled by an expected Radio Network Temporary Identifier (RNTI);
when the first CRC of the first PDCCH candidate is determined to pass the check, determining whether the first CRC of the first PDCCH candidate is a duplicate of another CRC of another PDCCH candidate of the least one PDCCH candidate determined to pass the check for the same expected RNTI, when the first CRC of the first PDCCH candidate is determined not be a duplicate of the another CRC of the another PDCCH candidate, storing in a memory the minimum path metric and the maximum path metric of the first CRC of the first PDCCH candidate, and when the first CRC of the first PDCCH candidate is determined to be a duplicate of the another CRC of the another PDCCH candidate, determining which of the first CRC of the first PDCCH candidate and the another CRC of the another PDCCH candidate has a larger difference between the minimum path metric and the maximum path metric respectively, and of the first CRC of the first PDCCH candidate and the another CRC of the another PDCCH candidate, storing in the memory only the minimum path metric and the maximum path metric determined to have the larger difference.

16. The device of claim 15, wherein the processing device is configured to control, when the first CRC of the first PDCCH candidate is determined to have the larger difference, overwriting the minimum path metric and the maximum path metric for the another CRC of the another PDCCH candidate stored in the memory with the minimum path metric and the maximum path metric for the first CRC of the first PDCCH candidate.

17. The device of claim 15, wherein the at least one PDCCH candidate includes all possible PDCCH candidates within the control region, and wherein the processing device is configured to control determining at least one most likely true PDCCH candidate from all PDCCH candidates for which the minimum path metric and the maximum path metric are stored in the memory.

18. The device of claim 17, wherein the at least one most likely true PDCCH candidate is determined as having the difference between the minimum path metric and the maximum path metric thereof larger than the difference between the minimum path metric and the maximum path metric for a second PDCCH candidate of the all PDCCH candidates stored in the memory.

19. The device of claim 17, wherein the at least one most likely true PDCCH candidate is determined based on grouping the all PDCCH candidates for which the minimum path metric and the maximum path metric are stored in the memory according to (i) a length and format of a payload message or (ii) the expected RNTI.

20. The device of claim 15, wherein the determining of whether the check of the first Cyclic Redundancy Check (CRC) of the first PDCCH candidate against the received CRC for the first PDCCH candidate passes is performed for each of a plurality of predetermined RNTIs as the expected RNTI until the first CRC of the first PDCCH candidate is determined to pass the check or the check is completed for all of the predetermined RNTIs.

\* \* \* \* \*